US010446177B1

(12) United States Patent
Suzuki et al.

(10) Patent No.: US 10,446,177 B1
(45) Date of Patent: Oct. 15, 2019

(54) DISK APPARATUS WITH FILTER UNIT HAVING DETACHABLE FRAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hirofumi Suzuki, Kawasaki Kanagawa (JP); Yasuhiko Kato, Setagaya Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/119,559

(22) Filed: Aug. 31, 2018

(30) Foreign Application Priority Data

Mar. 20, 2018 (JP) ................................. 2018-052774

(51) Int. Cl.
*G11B 5/48* (2006.01)
*G11B 5/127* (2006.01)

(52) U.S. Cl.
CPC ............ *G11B 5/4813* (2013.01); *G11B 5/127* (2013.01)

(58) Field of Classification Search
CPC ..... G11B 5/4813; G11B 5/127; G11B 33/146; G11B 33/1446
See application file for complete search history.

(56) References Cited

U.S. PATENT DOCUMENTS

| 4,888,655 A * | 12/1989 | Bonn | G11B 25/043 360/97.18 |
|---|---|---|---|
| 5,034,835 A * | 7/1991 | Yokoyama | G11B 25/043 360/97.17 |
| 5,140,578 A * | 8/1992 | Tohkairin | G11B 25/043 360/99.18 |
| 5,269,824 A * | 12/1993 | Takita | B01D 46/2403 55/385.1 |
| 5,270,887 A * | 12/1993 | Edwards | G11B 5/54 360/256.2 |
| 5,859,738 A * | 1/1999 | Forehand | G11B 5/40 360/75 |
| 6,008,965 A * | 12/1999 | Izumi | G11B 33/1446 360/97.16 |
| 6,128,159 A * | 10/2000 | Ino | G11B 25/043 360/97.16 |
| 6,208,484 B1 * | 3/2001 | Voights | G11B 33/1446 360/97.18 |

(Continued)

FOREIGN PATENT DOCUMENTS

JP H04-291082 A 10/1992

*Primary Examiner* — Brian E Miller
(74) *Attorney, Agent, or Firm* — Kim & Stewart LLP (57) ABSTRACT

A disk apparatus includes a casing, a rotatable disk recording medium that is disposed within the casing, a head configured to process information with respect to the recording medium, an actuator assembly that is disposed within the casing and that movably supports the head, and a filter unit that is disposed within the casing. The filter unit includes a base section fixed to an inner surface of the casing, a holding frame coupled to the base, and a collection filter detachably held in place by the holding frame.

16 Claims, 4 Drawing Sheets

(56) References Cited

U.S. PATENT DOCUMENTS

| | | | | |
|---|---|---|---|---|
| 6,266,208 B1* | 7/2001 | Voights | G11B 33/1446 | 360/97.18 |
| 6,636,379 B2* | 10/2003 | Rannow | G11B 25/043 | 360/97.14 |
| 6,898,048 B2* | 5/2005 | Adams | G11B 33/1446 | 360/97.14 |
| 7,450,338 B2 | 11/2008 | Hur | | |
| 7,564,647 B2* | 7/2009 | Suwa | G11B 5/54 | 360/97.14 |
| 7,593,181 B1* | 9/2009 | Tsay | G11B 25/043 | 360/97.17 |
| 7,686,871 B2* | 3/2010 | Oh | B01D 46/0005 | 360/97.18 |
| 8,638,525 B1* | 1/2014 | Sugii | G11B 25/043 | 360/97.15 |
| 8,885,290 B1* | 11/2014 | Gustafson | G11B 33/1466 | 360/97.16 |
| 8,908,319 B1* | 12/2014 | Gustafson | G11B 33/1453 | 360/97.16 |
| 9,666,235 B2* | 5/2017 | Jabbari | G11B 33/146 | |
| 2001/0017744 A1* | 8/2001 | Bae | G11B 33/1446 | 360/97.16 |
| 2002/0075590 A1* | 6/2002 | Garikipati | G11B 5/6005 | 360/97.17 |
| 2003/0151847 A1* | 8/2003 | Tsang | G11B 17/038 | 360/97.16 |
| 2005/0036232 A1* | 2/2005 | Macpherson | G11B 25/043 | 360/97.18 |
| 2005/0041334 A1* | 2/2005 | Kim | G11B 33/146 | 360/97.16 |
| 2005/0063093 A1* | 3/2005 | Hong | G11B 33/146 | 360/97.18 |
| 2006/0066992 A1* | 3/2006 | Chan | G11B 5/6005 | 360/97.16 |
| 2010/0321821 A1* | 12/2010 | Iwase | G11B 33/1486 | 360/97.16 |
| 2011/0109989 A1* | 5/2011 | Turner | G11B 33/1486 | 360/97.16 |
| 2012/0275053 A1* | 11/2012 | McGuire, Jr. | G11B 25/043 | 360/97.16 |
| 2013/0148239 A1* | 6/2013 | Lee | G11B 33/146 | 360/97.18 |
| 2017/0236556 A1* | 8/2017 | Kato | B01D 29/56 | 360/97.17 |

* cited by examiner

DISK APPARATUS WITH FILTER UNIT HAVING DETACHABLE FRAME

CROSS-REFERENCE TO RELATED APPLICATION

This application is based upon and claims the benefit of priority from Japanese Patent Application No. 2018-052774, filed Mar. 20, 2018, the entire contents of which are incorporated herein by reference.

FIELD

Embodiments described herein relate generally to a disk apparatus.

BACKGROUND

A disk apparatus, for example, a hard disk drive (HDD) includes, as an example, various movable components, such as magnetic disks disposed within a casing, a spindle motor that supports the magnetic disks and drives the magnetic disks to rotate, an actuator assembly that supports magnetic heads, a voice coil motor that drives this actuator assembly, and the like. Furthermore, the HDD includes a collection filter (such as a circulation filter) that captures dust generated within the casing due to operation of the movable components. An HDD that uses an electrostatic filter as the collection filter has been proposed.

Normally, the collection filter is installed within the casing so that the collection filter is sandwiched between a top cover and a base of the casing. Meanwhile, the number of magnetic disks included in HDDs is on the increase, to expand a memory capacity of HDDs. To accommodate a larger number of magnetic disks in the casing, it is generally necessary to make a wall thickness of the base thinner. A thinner wall thickness causes a corresponding reduction in strength of the base. Owing to this, with the collection filter sandwiched between the top cover and the base of the casing, a load acts on the base that can potentially deform the base.

Moreover, to prevent the deformation of the casing during a repair of the HDD, disassembly is complicated because it is necessary to peel off the collection filter (which is stuck on an inner surface of the casing with an adhesive) from the casing and discard the collection filter when mounted components are washed during the repair.

DETAILED DESCRIPTION

An embodiment provides a disk apparatus that can facilitate attaching/detaching a filter.

In general, according to one embodiment, a disk apparatus includes a casing, a rotatable disk recording medium that is disposed within the casing, a head configured to process information with respect to the recording medium; an actuator assembly that is disposed within the casing and that movably supports the head, and a filter unit that is disposed within the casing. The filter unit includes a base section fixed to an inner surface of the casing, a holding frame coupled to the base, and a collection filter detachably held in place by the holding frame.

Disk apparatuses according to embodiments will be described hereinafter with reference to the drawings. It is noted that the disclosure is presented by way of example only and matters which can be changed as appropriate without departing from the spirit of the disclosure and which could easily be conceived of fall within the scope of the present disclosure. Moreover, the drawings are often depicted schematically in widths, thicknesses, shapes, and the like of portions, compared with actual dimensions for making clearer descriptions. However, the drawings are presented by way of example only and do not limit the scope of the present disclosure. Furthermore, in the present specification and the drawings, similar elements to those previously described with reference to drawings already described are denoted by the same reference labels and description thereof is often omitted as appropriate.

First Embodiment

A hard disk drive (HDD) according to a first embodiment will be described in detail as a disk apparatus.

Figure 1:
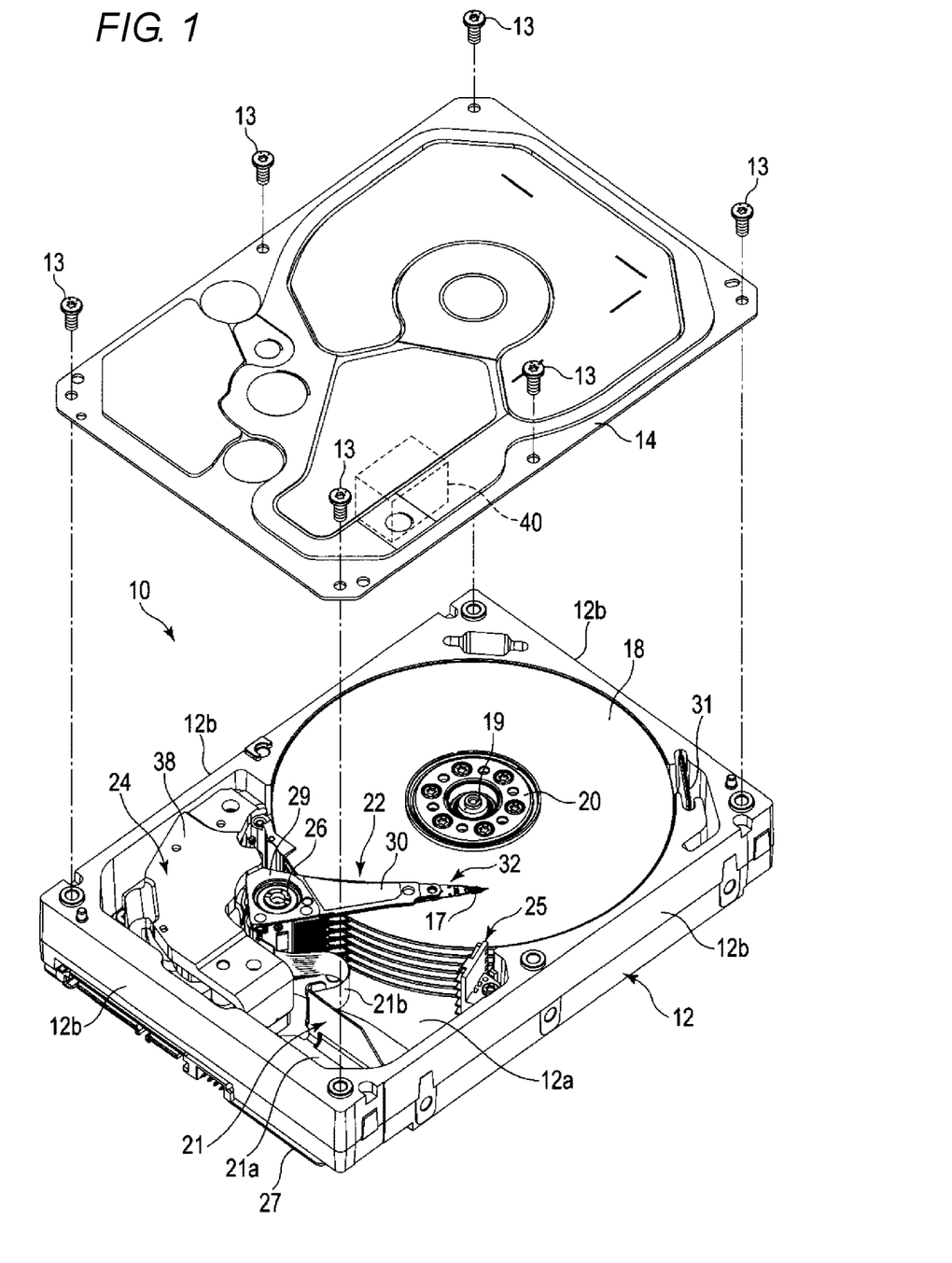
FIG. 1 is an exploded perspective view illustrating a hard disk drive (HDD) according to a first embodiment with a top cover disassembled.

FIG. 1 is an exploded perspective view of the HDD according to a first embodiment with a top cover detached.

The HDD includes a flat, generally rectangular casing 10. This casing 10 has a rectangular box-like base 12 having an open upper surface and a top cover 14. The base 12 has a rectangular bottom wall 12a that opposes the top cover 14 with a gap disposed therebetween and a side wall 12b built along a periphery of the bottom wall 12a. The bottom wall 12a and the side wall 12b are formed integrally out of, for example, aluminum. The top cover 14 is formed into a rectangular plate shape out of, for example, stainless steel. The top cover 14 is screwed on the side wall 12b of the base 12 by a plurality of screws 13, and covers the upper opening of the base 12.

A plurality of magnetic disks 18 that serve as disk recording mediums and a spindle motor 19 that supports and rotates the magnetic disks 18 are disposed within the casing 10. The spindle motor 19 is disposed on the bottom wall 12a. Each magnetic disk 18 is formed with a diameter of, for example, 88.9 mm (3.5 inches) and has a magnetic recording layer on an upper surface or a lower surface thereof. The magnetic disks 18 are coaxially fitted into a hub (not shown) of the spindle motor 19 and also clamped by a clamp spring 20 to be fixed to the hub. Each magnetic disk 18 is thereby supported to be located in parallel to the bottom wall 12a of the base 12. The magnetic disk 18 is rotated at a predetermined rotational speed by the spindle motor 19.

While the present embodiment indicates an example in which seven magnetic disks 18 are disposed within the casing 10 as shown in FIG. 1, the number of magnetic disks 18 is not limited to seven.

Also disposed within the casing 10 are plurality of magnetic heads 17 for recording (writing) information to and reproducing (reading) information from the magnetic disks 18 and an actuator assembly 22 that supports these magnetic heads 17 so that the magnetic heads 17 are movable relatively to the magnetic disks 18. Further disposed within the casing 10 are a voice coil motor (VCM) 24 that rotates and positions the actuator assembly 22, a ramp load mechanism 25, and a board unit (a flexible printed circuit or FPC) 21. The VCM holds any magnetic head 17 at an unloaded position apart from the corresponding magnetic disk 18 when the magnetic head 17 moves to an outermost circumference of the magnetic disk 18. In the FPC unit 21, electronic components such as a conversion connector are mounted.

A printed circuit board 27 is screwed on an outer surface of the bottom wall 12a of the base 12. The printed circuit board 27 is configured with a control unit that controls operation of the spindle motor 19, and also controls operation of the VCM 24 and the magnetic heads 17 via the FPC unit 21.

The actuator assembly 22 has an actuator block 29, a plurality of, for example, eight arms 30 that extend in the same direction from the actuator block 29, and a plurality of head gimbal assemblies (HGAs) 32 attached to ends of the respective arms 30 that extend away from the actuator block 29. The actuator block 29 is rotatably supported by a support shaft (pivot) 26 coupled to the bottom wall 12a via a unit bearing, which is not shown. Each HGA 32 has a suspension (load beam), which is not shown, extending from each arm 30 and a flexure (an interconnection member), which is not shown, disposed on the load beam and the arm 30. Each magnetic head 17 is placed on a gimbal portion of a respective flexure.

The actuator assembly 22 further includes a support frame, which is not shown, extending from the actuator block 29 in a direction opposite to the arms 30, and a voice coil, which is not shown, attached to this support frame. The voice coil is located between a pair of yokes 38 installed on the bottom wall 12a, and the voice coil, the yokes 38, and a magnet, which is not shown, are fixed to any of the yokes 38 to form the VCM 24.

The FPC unit 21 has a main body 21a formed by a flexible printed circuit board, and this main body 21a is fixed to the bottom wall 12a of the base 12. The electronic components such as the conversion connector are mounted on the main body 21a. The conversion connector passes through the bottom wall 12a and is connected to the printed circuit board 27. The FPC unit 21 has a relay flexible printed circuit board (hereinafter, referred to as "relay FPC") 21b extended from the main body 21a. An extending end portion of the relay FPC 21b is attached to a side surface (installation surface) of the actuator block 29. The extending end portion of the relay FPC 21b is electrically connected to each magnetic head 17 via the flexure described above.

A circulation filter (collection filter) 31 is disposed near the side wall 12b and located outside of the magnetic disks 18 that are within the casing 10. The circulation filter 31 captures dust and other particulates generated within the casing 10 due to the operation of movable components, such as the spindle motor 19.

According to the present embodiment, the HDD further includes a filter unit 40 disposed within the casing 10, and this filter unit 40 has a collection filter. As an example, the filter unit 40 is fixed to an inner surface of the top cover 14. The filter unit 40 will be described in detail below.

Figure 2:
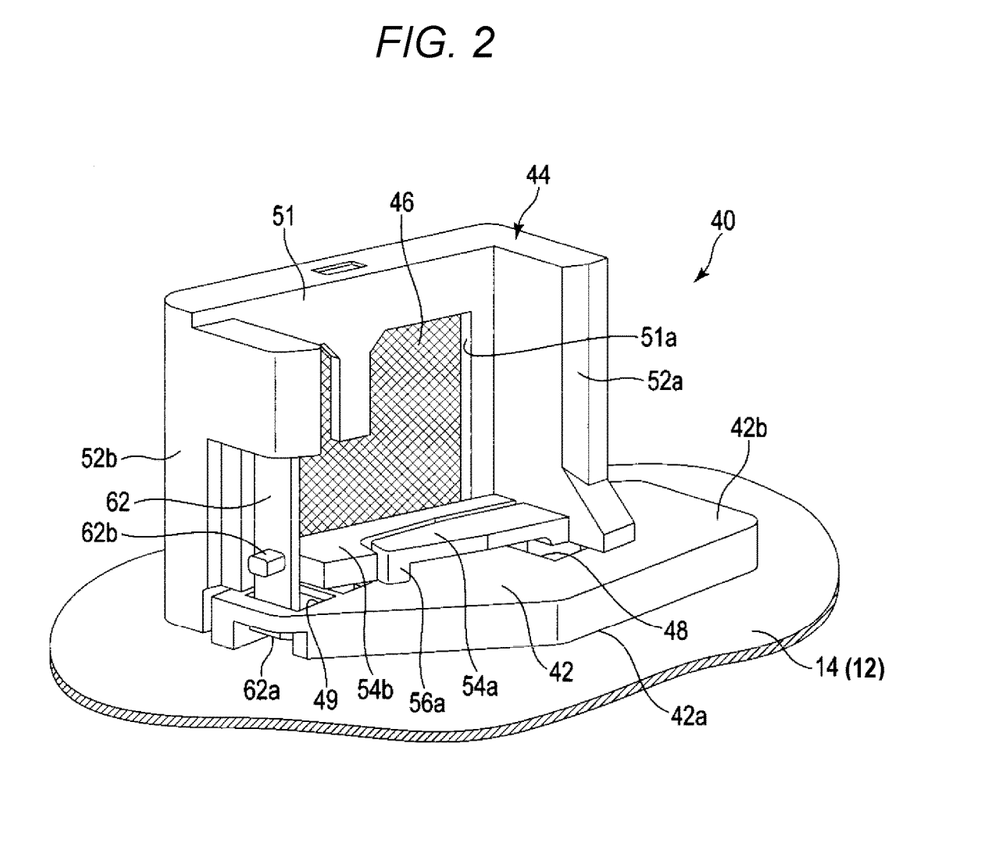
FIG. 2 is a perspective view illustrating a filter unit of the HDD.
Figure 3:
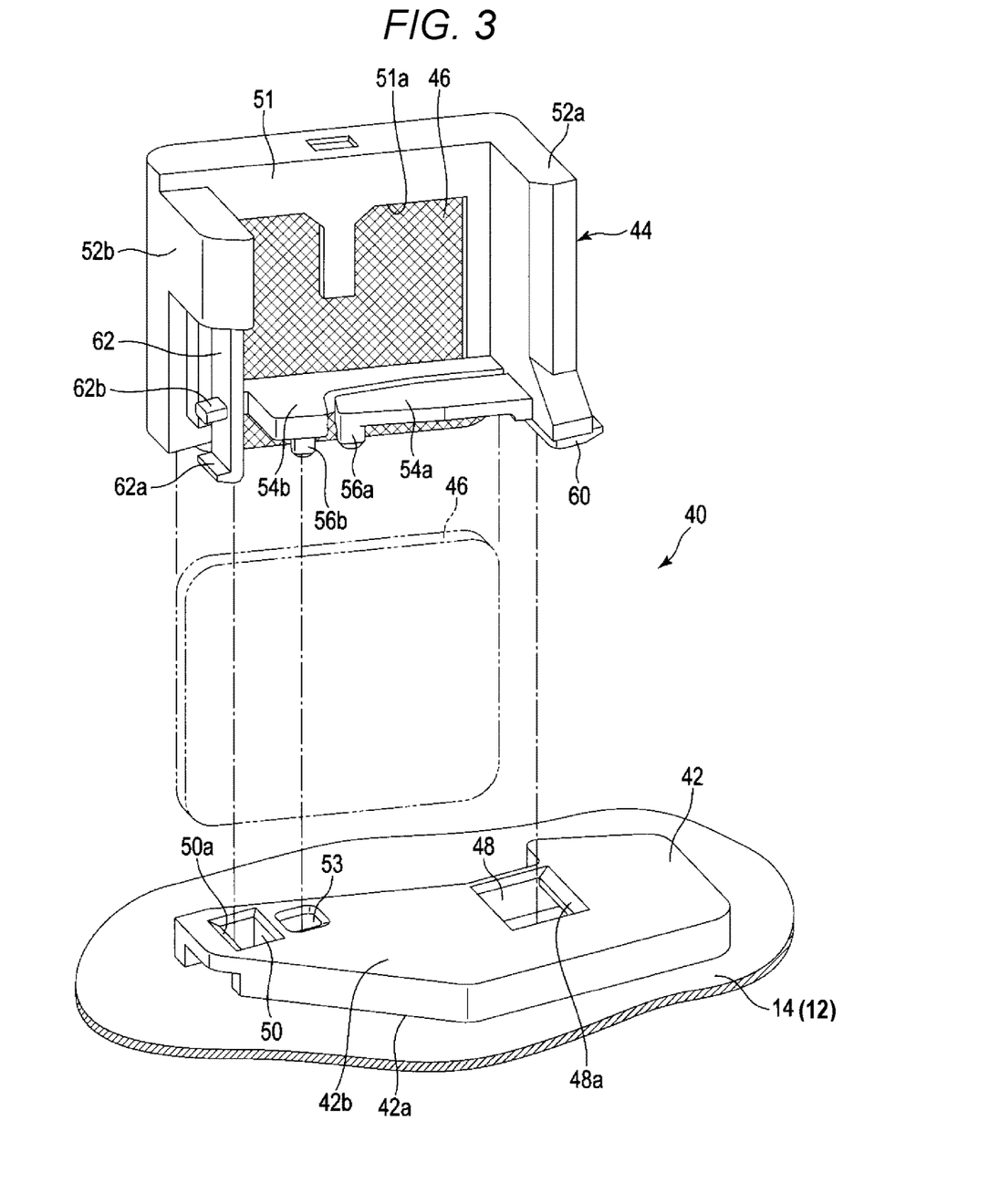
FIG. 3 is an exploded perspective view illustrating a base section and a holding frame of the filter unit.

FIG. 2 is a perspective view illustrating the filter unit (collection filter), and FIG. 3 is an exploded perspective view illustrating a base section and a holding frame of the filter unit.

As shown in FIGS. 2 and 3, the filter unit 40 has a plate-like base section 42 formed out of synthetic resin, a holding frame 44 detachably attached to the base section 42 and formed out of synthetic resin, and a filter main body (collection filter) 46 held by the holding frame 44.

The base section 42 has a first surface 42a and a second surface 42b opposed to the first surface 42a. The first surface 42a of the base section 42 is stuck on or otherwise coupled to the inner surface of the top cover 14 by, for example, an adhesive. The base section 42 has a first through-hole 48, a second through-hole 50, and a positioning recess 53. Part of the holding frame 44 is engaged with the first through-hole 48 and another part of holding frame 44 is engaged with the second through-hole 50. As an example, the first through-hole 48, which functions as a first recessed portion, has a rectangular cross-sectional shape and is open from the first surface 42a to the second surface 42b of the base section 42. The base section 42 has a first protruding portion (such as a hook) 48a that protrudes from one side of the first through-hole 48 into the first through-hole 48. The second through-hole 50, which functions as a second recessed portion, is disposed at a predetermined distance from the first through-hole 48. As an example, the second through-hole 50 has a rectangular cross-sectional shape and is open from the first surface 42a to the second surface 42b of the base section 42. The base section 42 has a second protruding portion (such as a hook) 50a that protrudes from one side of the second through-hole 50 into the second through-hole 50. In the embodiment illustrated in FIGS. 2 and 3, the first protruding portion 48a is disposed on a first side of the first through hole 48 and the second protruding portion 50a is disposed on a second side of the second through-hole 50, where the first side and the second side are each on an opposite side of their respective through-hole. For example, the first side may be on a side of the first through hole 48 that faces one of the rectangular bottom walls 12a, while the second side may be on a side of the second protruding portion 50a that faces the other of the rectangular bottom walls 12a.

The positioning recess 53 is located between the first through-hole 48 and the second through-hole 50 and is open formed in the second surface 42b of the base section 42.

The holding frame 44 has a rectangular main wall 51, a pair of side walls 52a and 52b that extend from two sides of the main wall 51 in the same direction, for example, a direction orthogonal to the main wall 51, and a first beam 54a and a second beam 54b. The first beam 54a and the second beam 54b extend from one side wall 52a toward the other side wall 52b, as shown. The main wall 51, the side walls 52a and 52b, and the first and second beams 54a and 54b can be formed as a single integrated component by synthetic resin or the like. The main wall 51 and the pair of side walls 52a and 52b are positioned generally perpendicular to the top cover 14. The pair of side walls 52a and 52b are positioned to oppose each other, and are generally in parallel with each other so that a substantially uniform distance is kept therebetween. Furthermore, the first beam 54a and the second beam 54b extend from a lower end portion of the side wall 52a, that is, the end portion closer to the base section 42 and in a direction perpendicular to the side wall 52a. The first beam 54a and the second beam 54b extend generally in parallel to the base section 42.

The main wall 51 is formed into a hollow shape, with an inner space (accommodation section) thereof open to a lower portion of the main wall 51. Specifically, an opening (window) 51a is formed from one principal surface to the other principal surface of the main wall 51. The filter main body 46 is inserted into the main wall 51 from a lower end side (side facing top cover 14) of the opening 51a of the main wall 51 and held in the main wall 51. Most of the filter main body 46 is exposed through the opening 51a. As an example, the filter main body 46 has a breathable sac-like outer cover and an electret fiber, a nonwoven fabric or the like filled in the outer cover. A resin woven fabric, for example, a polyethylene terephthalate (PET) woven fabric, can be used as the outer cover.

The side wall 52a has a first hook (first engagement portion) 60 protruding from a lower end of the side wall 52a and formed integrally with the side wall 52a. The first hook 60 is formed to be engageable with the first protruding portion 48a of the base section 42. The other side wall 52b has a plate-like lock lever 62 extending from a location approximately halfway in a height direction of the other side wall 52b to a location proximate a lower end of the side wall 52b. The plate-like lock lever 62 is formed integrally with the side wall 52b. The lock lever 62 has a second hook 62a protruding from a tip of lock lever 62 proximate that is on a lower end (an end facing top cover 14) of lock lever 62 and a pressing projection 62b. The second hook 62a extends outward (in an opposite direction from the other side wall 52a). The pressing projection 62b protrudes from a portion halfway in the height direction of the lock lever 62. The second hook 62a and the pressing projection 62b can be formed integrally with the lock lever 62. The second hook 62a is formed to be engageable with the second protruding portion 50a of the base section 42. The lock lever 62 is elastically deformable toward the side wall 52a and, when so deformed, elasticity of the lock lever 62 urges the lock lever 62 in an opposite side from the side wall 52a. When the pressing projection 62b is pressed to deform the lock lever 62 toward the side wall 52a, the second hook 62a is disengaged from the second protruding portion 50a and thusly can be unlocked.

Furthermore, the first beam 54a has a pressing projection 56a that protrudes from a lower surface (a surface facing top cover 14) of a tip portion of the first beam 54a and is formed integrally with the first beam 54a. The pressing projection 56a is positioned and configured to abut on the second surface 42b of the base section 42. Together, the first beam 54a and the pressing projection 56a form a preload application member that applies a preload to the holding frame 44. The second beam 54b has a positioning projection 56b protruding from a lower surface of a tip portion of the second beam 54b. The positioning projection 56b is formed to be engageable with the positioning recess 53 of the base section 42.

As shown in FIG. 2, the holding frame 44 that accommodates the filter main body 46 is detachably attached to the base section 42. When the holding frame 44 is attached to the base section 42, the first hook 60 is first inserted into the first through-hole 48 of the base section 42 to be engaged with the first protruding portion 48a. The second hook 62a of the lock lever 62 is then urged into the second through-hole 50, to be engaged with the second protruding portion 50a. Then, the lock lever 62 is elastically deformed toward the side wall 52a by abutment of the second hook 62a on the second protruding portion 50a, and then returns to an original position when the second hook 62a passes beyond the second protruding portion 50a. The second hook 62a is thereby caught in, that is, engaged with the second protruding portion 50a.

The positioning projection 56b of the second beam 54a is engaged with the positioning recess 53 of the base section 42, thereby positioning the holding frame 44 at a predetermined position relative to the base section 42. Moreover, the pressing projection 56a of the first beam 54a abuts on the second surface 42b of the base section 42, so that the first beam 54a is elastically deformed in a direction away from the base section 42, with a proximal end portion thereof acting as a fulcrum. Such deformation of the first beam 54a causes the first beam 54a to generate an elastic force (that attempts to return the first beam 54a to an original position) that presses the pressing projection 56a against the second surface 42b of the base section 42 and urges the holding frame 44 in a direction away from the base section 42. By urging the holding frame 44 in the direction away from the base section 42, the elastic force causes the first and second hooks 60 and 62a to engage with the first protruding portion 48a and the second protruding portion 50a, respectively. This urging force (i.e., this preload) applied to the holding frame 44 causes the first hook 60 and the second hook 62b to be pressed against the first protruding portion 48a and the second protruding portion 50a, thereby preventing backlash. In this way, the holding frame 44 is attached to the predetermined position of the base section 42 without backlash.

To detach the holding frame 44 and the filter main body 46, the pressing projection 62b of the lock lever 62 is pressed to deform the lock lever 62 toward the side wall 52a, thereby disengaging (unlocking) the second hook 62a from the second protruding portion 50a. The holding frame 44 is the raised and the first hook 60 is withdrawn from the first through-hole 48; thus, it is possible to detach the holding frame 44 and the filter main body 46 from the base section 42. It is noted that the filter main body 46 can be withdrawn through the lower end side (the side facing top cover 14) of the opening 51a of the main wall 51.

The filter unit 40 configured as described above is disposed in a space between the FPC unit 21 and the magnetic disks 18 by fixing the top cover 14 to the base 12. An air flow generated by rotation of the magnetic disks 18 passes through the filter main body 46 (and therefore the collection filter) via the opening 51a of the holding frame 44. Thus, the filter main body 46 collects dust contained in the air flow.

The HDD and the filter unit 40 configured as described above can facilitate attaching/detaching the filter main body 46 and the holding frame 44 to/from the casing 10. Owing to this, at a time of, for example, cleaning the components mounted in the HDD during repair of the HDD, the filter main body 46 and the holding frame 44 can be easily detached from the top cover 14 without damaging the filter main body 46. After cleaning, the filter main body 46 and the holding frame 44 are attached to the base section 42, thereby enabling reuse of the filter main body 46.

The filter unit 40 is fixed to or stuck on an inner surface of the casing 10. In other words, the filter unit 40 is not structured to be fixedly sandwiched between the top cover 14 and the base 12. As a result, installing the filter unit 40 does not cause deformation of the base 12, even when the material of the base 12 is relatively thin.

While being attached to the base section 42, the holding frame 44 is urged in an engagement direction by the first beam 54a; thus, it is possible to eliminate the backlash between the holding frame 44 and the base section 42 and prevent generation of dust and generation of noise due to the backlash motion. Furthermore, since an attachment/detachment structure for attaching/detaching the holding frame 44 to/from the base section 42 is a simple structure that includes catching the first hook 60 on the protruding portion 48a and the second hook 62a on the protruding portion 50a, generation of dust is prevented or avoided when attaching/detaching the holding frame 44.

Thus, according to the first embodiment, attachment/detachment of a filter in a disk apparatus is facilitated.

It is noted that an installation position of the filter unit 40 is not limited to the inner surface of the top cover 14 but may include another inner surface of the casing 10, for example, the bottom wall 12a of the base 12 in the first embodiment.

A filter unit of an HDD according to another embodiment will next be described. In another embodiment described below, the same elements as those in the above-mentioned first embodiment are denoted by the same reference labels, and detailed descriptions thereof will be either omitted or simplified, and parts different from those in the first embodiment will primarily be described.

Second Embodiment

Figure 4:
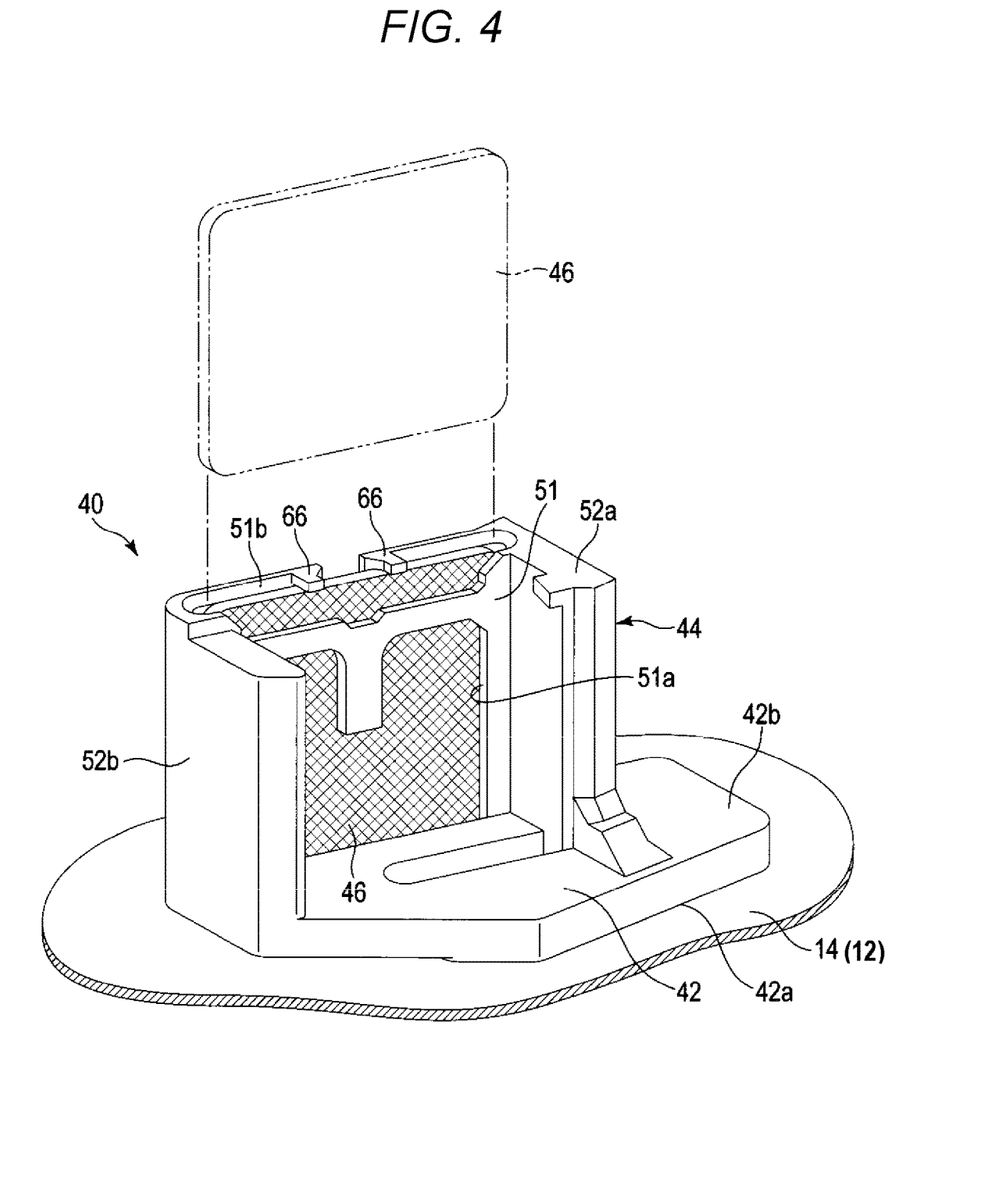
FIG. 4 is a perspective view illustrating a filter unit of an HDD according to a second embodiment.

FIG. 4 is a perspective view illustrating a filter unit of an HDD according to a second embodiment.

As shown in FIG. 4, according to the second embodiment, the filter unit 40 includes the plate-like base section 42 and the holding frame 44, and the base section 42 and the holding frame 44 are formed as an integrated component out of synthetic resin or the like. The base section 42 is stuck on or otherwise coupled to the inner surface of the casing 10, for example, on the inner surface of the top cover 14.

An insertion opening 51b is formed in an upper surface and a front surface of an upper end portion of the main wall 51. That is, the insertion opening is formed in an end portion of the main wall that is opposite to the base section 42. The insertion opening 51b is in fluid communication with the inner space (accommodation section) of the main wall 51. The filter main body 46 can be thereby inserted into and extracted from the inner space of the main wall 51 through the insertion opening 51b. In other words, the filter main body 46 can be attached/detached to/from the holding frame 44 while the holding frame 44 is coupled to the top cover 14.

A pair of stoppers 66 protruding from the insertion opening 51b are disposed on an upper end of the main wall 51. The stoppers 66 abut on an upper end edge of the filter main body 46 when the filter main body 46 is installed in holding frame 44, and therefore restrict detachment of the filter main body 46 from the holding frame 44. These stoppers 66 are configured to be elastically deformable to positions away from the insertion opening 51b. To attach the filter main body 46 to the holding frame 44 or detached the filter main body 45 from the holding frame 44, the stoppers 66 are deformed to the positions away from the insertion opening 51, so that the insertion opening 51b is cleared of obstructions.

It is noted that since the filter main body 46 is formed out of a relatively soft material, the filter main body 46 can be attached to the holding frame 44 or detached from the holding frame 44 by partially bending the filter main body 46 in such a way as to keep away from the stoppers 66. In other words, in some embodiments, it is also possible to attach/detach the filter main body 46 without deforming the stoppers 66.

In the second embodiment, other configurations of the HDD are the same as those of the HDD according to the above-mentioned first embodiment.

The HDD and the filter unit 40 configured as described above can facilitate attaching/detaching the filter main body 46 to/from the casing 10. During, for example, cleaning the components mounted in the HDD during repair of the HDD, the filter main body 46 can be easily detached from the top cover 14 without damaging the filter main body 46. After cleaning, the filter main body 46 and the holding frame 44 are attached to the base section 42, thereby making it possible to reuse the filter main body 46.

According to the present embodiment, the base section 42 and the holding frame 44 are formed integrally as a single component; thus, it is possible to simplify a structure of the filter unit 40. At the same time, it is possible to eliminate the backlash between the base section 42 and the holding frame 44 and prevent the generation of dust and the generation of noise.

In light of the above, according to the second embodiment, attachment/detachment of a filter in a disk apparatus is facilitated.

The present disclosure is not limited to the above mentioned embodiments but the present disclosure can be embodied by modifying the constituent elements without departing from the spirit of the present disclosure in an implementation phase. Furthermore, various inventions can be embodied by combining a plurality of constituent elements disclosed in the above-described embodiments as appropriate. For example, some of the constituent elements may be deleted from all the constituent elements described in the embodiments. Moreover, the constituent elements across the different embodiments may be combined as appropriate.

For example, a shape and the dimensions of the filter unit are not limited to those in the embodiments described above but can be changed. The shape of the filter main body is not limited to a rectangular shape, but can be selected from among various shapes depending on an available installation space. Moreover, in the HDD, the number of magnetic disks is not limited to seven but may be equal to or smaller than six or equal to greater than eight, and the number of HGAs and the number of magnetic heads may be increased or reduced depending on the number of installed magnetic disks.

The accompanying claims and their equivalents are intended to cover such forms or modifications as would fall within the scope and spirit of the inventions.

What is claimed is:

1. A disk apparatus, comprising:
   a casing;
   a rotatable disk recording medium that is disposed within the casing;
   a head configured to process information with respect to the recording medium;
   an actuator assembly that is disposed within the casing and that movably supports the head; and
   a filter unit that is disposed within the casing, wherein
   the filter unit includes a base section fixed to an inner surface of the casing, a holding frame detachably coupled to the base section, and a collection filter detachably held in place by the holding frame, and
   the base section includes a first surface that faces the inner surface of the casing, a second surface opposed to the first surface, a first recessed portion formed on the second surface, and a second recessed portion formed on the second surface, and
   the holding frame includes:
      a first protruding portion including a first hook that engages the first recessed portion when inserted into the first recessed portion, and
      a second protruding portion including a second hook that engages the second recessed portion when inserted into the second recessed portion.

2. The disk apparatus according to claim 1, wherein the holding frame further includes an elastically deformable lock lever on which the second hook is disposed.

3. The disk apparatus according to claim 1, wherein the holding frame further includes a preload application member that urges the holding frame in a direction away from the base section when the first hook engages the first recessed portion and the second hook engages the second recessed portion.

4. The disk apparatus according to claim 3, wherein
the preload application member urges the holding frame away from the base section via elastic deformation of the preload application member.

5. The disk apparatus according to claim 3, wherein
the preload application member includes a first beam that extends from the holding frame and a pressing projection that is disposed on a tip portion of the first beam and abuts on the second surface of the base section.

6. The disk apparatus according to claim 1, wherein
the first recessed portion includes a first through-hole formed on the base section and the second recessed portion includes a second through-hole formed on the base section.

7. The disk apparatus according to claim 1, wherein
the base section further includes a third recessed portion formed on the second surface, and
the holding frame further includes a positioning protrusion that protrudes into the third recessed portion and positions the holding frame at a predetermined position relative to the base section.

8. The disk apparatus according to claim 1, wherein
the casing includes a base that accommodates the recording medium and a top cover that is fixed to the base, the base section of the filter unit being fixed to an inner surface of the top cover.

9. The disk apparatus according to claim 8, wherein
the filter does not contact an inner surface of the base.

10. The disk apparatus according to claim 1, wherein
the casing includes a base that accommodates the recording medium and a top cover that is fixed to the base, the base section of the filter unit being fixed to an inner surface of the base.

11. The disk apparatus according to claim 10, wherein
the filter does not contact an inner surface of the top cover.

12. The disk apparatus according to claim 1, wherein
the filter unit is disposed between the rotatable disk recording medium and a flexible printed circuit that is coupled to the actuator assembly.

13. A disk apparatus, comprising:
a casing;
a rotatable disk recording medium that is disposed within the casing;
a head configured to process information with respect to the recording medium;
an actuator assembly that is disposed within the casing and that movably supports the head; and
a filter unit that is disposed within the casing, wherein
the filter unit includes a base section fixed to an inner surface of the casing, a holding frame that is formed integrally with the base section and coupled to the base section, and a collection filter detachably held in place by the holding frame,
the holding frame has an accommodation section that accommodates the collection filter and an insertion opening that is open to an end portion of the holding frame and communicates with the accommodation section, and
the holding frame includes a stopper that protrudes into the insertion opening and abuts on an end of the collection filter when the collection filter is disposed in the accommodation section.

14. The disk apparatus according to claim 13, wherein
the collection filter is inserted into the accommodation section and withdrawn from the accommodation section through the insertion opening.

15. The disk apparatus according to claim 13, wherein
the casing includes a base that accommodates the recording medium and a top cover that is fixed to the base, the base section of the filter unit being fixed to an inner surface of the base.

16. The disk apparatus according to claim 15, wherein
the filter does not contact an inner surface of the top cover.

* * * * *